United States Patent
Demmer et al.

(10) Patent No.: US 6,529,540 B1
(45) Date of Patent: Mar. 4, 2003

(54) VARIABLE OUTPUT COUPLING LASER

(75) Inventors: David Demmer, Toronto (CA);
Dwayne R. J. Miller, Port Credit (CA);
Barry Bruner, North York (CA)

(73) Assignee: Photonics Research Ontario, Toronto (CA)

( * ) Notice: Subject to any disclaimer, the term of this patent is extended or adjusted under 35 U.S.C. 154(b) by 0 days.

(21) Appl. No.: 09/401,804

(22) Filed: Sep. 22, 1999

(51) Int. Cl.[7] .............................. H01S 3/10; H01S 3/13; H01S 3/09; H01S 3/08

(52) U.S. Cl. ........................ 372/92; 372/25; 372/27; 372/29.01; 372/30; 372/73; 372/99

(58) Field of Search ................ 372/10, 12, 30, 372/92, 99, 13, 20, 25, 26, 27, 29.01, 29.011, 89, 90, 73

(56) References Cited

U.S. PATENT DOCUMENTS 4,288,691 A * 9/1981 Horton ..................... 331/94.5
4,872,181 A * 10/1989 Johnson et al. ............. 372/106
4,930,901 A * 6/1990 Johnson et al. .............. 372/26

* cited by examiner

*Primary Examiner*—Paul Ip
*Assistant Examiner*—Armando Rodriguez
(74) *Attorney, Agent, or Firm*—Lynn Schumacher; Hill & Schumacer

(57) ABSTRACT

A method and circuit is disclosed for providing a control signal to a laser cavity controller. The cavity has two completely reflective surfaces. A long lived laser medium stores energy within the cavity. A computer generated waveform generated from enough values to appear substantially smooth after being amplified is provided to a control circuit having a Pockels cell or a Bragg cell. By controlling the amplitude of the computer generated waveform, the output pulse of the laser cavity is controlled.

13 Claims, 6 Drawing Sheets

VARIABLE OUTPUT COUPLING LASER

FIELD OF THE INVENTION

This invention relates generally to the coupling of light out of a laser cavity in a controlled manner.

BACKGROUND OF THE INVENTION

A laser includes two reflecting surfaces, typically one surface being more reflective than the other, an active medium between the reflecting surfaces, and a power source capable of exciting the active medium.

The power source is capable of pumping the active medium to promote a portion of its constituents to an excited state. Pumping can be electrical or optical. The active medium can be atoms or molecules in a gas, a liquid, a glass, or a crystalline solid. What is important is that the excited species be capable of emitting radiation by the process of stimulated emission; for example, that a photon passing in proximity to an excited species can stimulate that species to emit a second photon identical in energy, phase, and direction to the first.

A laser begins to oscillate when a first randomly emitted photon leaves the medium, strikes one of the reflecting surfaces and is reflected back through the medium; it then stimulates a stream of identical photons to travel along with it in an amplified beam. If these photons are reflected back into the medium, they will each be amplified. As long as the gain per round trip exceeds the losses per round trip, the result is a build-up of circulating photons. However, the population of excited state species in the medium will become depleted, due to the transfer their energy to the photon beam oscillating between the reflecting surfaces. If the pumping is continuous, the laser may settle down to a continuous operation, but if the pump is pulsed or occurs at too low a rate, the photon beam will deplete the medium and the laser will turn off again after emitting a pulse of light.

In general, a laser will begin to oscillate as soon as the gain supplied by the pump exceeds the losses imposed by scattering, transmission through the output coupling mirror, and so on, This is referred to as "reaching threshold".

A useful laser output signal is usually obtained by having one of the mirrors coated so as to transmit some fraction of the light falling on it. The fraction depends upon the nature of the medium and the rate of pumping and is a critical factor in optimizing performance. If there is 0% output coupling, no output will be obtained from the laser; in this instance the light will oscillate and be very intense inside the laser cavity, but none will exit the cavity to be useful. In contrast, if there is 100% coupling, the effect is as if there are no reflectors at all; and, the laser will not operate, as it has no feedback. For any laser system, the optimum lies somewhere between these extremes of 0% and 100% output coupling.

Some media are capable of storing energy for a relatively long time; hence, their excited state species are long-lived. In this instance, it can be beneficial to block one of the reflectors to prevent photons from circulating within the cavity, while pumping the medium for an extended predetermined period of time. In this manner, the pump energy can be integrated, and when the reflector is unblocked, the intensity of the resulting laser pulse increases more than it would were the laser simple allowed to begin oscillating on its own. This process is known as Q-switching.

"Q" refers to the cavity quality factor; a value of Q=1 implies no losses at all, and a value of Q=0 implies 100% loss. The idea is that a very low Q-cavity will allow the build-up of very large gain, and if the Q is suddenly raised, the gain will greatly exceed the loss and the laser will produce a hugely amplified output until the gain is depleted.

A common way of Q-switching is to construct a laser cavity as is shown in prior art FIG. 1. An active medium in the form of a rod 12 with Brewster angle ends is disposed between a high reflecting surface in the form of a mirror 14a, preferably being 100% reflective and an output coupling mirror having a reflectivity less than 100%. A polarizer 16 is shown between the active medium 12 and the output-coupling mirror 14b. A crystalline material in the form of a Pockels cell 18 is disposed between the polarizer 16, and a quarter-wave plate 19 is located between the Pockels cell 18 and the polarizer 16. In operation, these elements ensure that light polarized in the plane of the page of FIG. 1 can oscillate in the cavity. The oscillation of the light can be effectively blocked by having the quarter-wave plate 19 in the cavity and adjusting it so that two passes through it result in a 90 degree rotation of the plane of polarization. Thus, horizontally polarized light passing from the rod towards the output coupling mirror strikes the mirror 14b and returns towards the rod; since the light is vertically polarized it will be reflected out of the cavity by the polarizer and cannot get back to the rod to be amplified. Hence, the cavity is effectively blocked.

The Pockels cell functions as a variable wave plate activated by an applied voltage. Using a suitable voltage the net rotation on a round trip through both the wave plate 19 and the Pockels cell 18 can be made to vanish, and the laser cavity thus switches from low to high Q.

The polarizer 16, quarter-wave plate 19, and Pockels cell 18 form a Q-switch in combination with required control circuitry. The laser is operated by ensuring that the Q-Switch blocks or prevents oscillations in a controlled manner while a pulsed light source is used to pump the laser rod 12. Typically the Q-switch is maintained in a closed state where Q=0 until the pump pulse is terminated, and the rod has accumulated a significant portion of the energy from the pump. By opening the Q-switch such that Q >0, the light can circulate and due to the very high laser gain, the buildup in the circulating intensity is very fast and very large. The partially transmissive output coupling mirror 14b allows a portion of this circulating power to escape on each round trip; this constitutes a useful laser output signal. The pulse intensity and duration are only indirectly controllable, and result from a combination of how quickly the Q-switch can open, and how quickly the gain stored in the laser rod 12 is depleted by the circulating laser beam.

One drawback to the prior art system described heretofore, is that is suffers from having an output pulse profile that is determined by the opening time of the Q-switch and the depletion of the gain from the rod; this is typically a single large spike of a few tens of nanoseconds in duration. For many applications this is too much energy too quickly and has been known to cause problems in various material processing situations.

U.S. Pat. No. 4,630,275 in the name of Rapoport discloses a controlled slow Q-switch. By applying a staircase-shaped control signal to a laser Q-switch, a plurality of laser pulses are emitted with controlled energy and time separation. Compared with conventional Q-switching, the invention enables the laser to emit pulses with shorter time intervals, narrower line widths, higher output energy, and more uniform power density across the laser beam cross section. Rappaport provides a tri-level voltage input signal in order to obtain three short uniform Q-switched pulses from the output of the laser cavity.

U.S. Pat. No. 4,660,205 which discloses a technique for achieving extremely short laser pulses uses pulse-transmission mode (PTM) Q-switches. This device also uses a Pockels cell and polarizer to rapidly drain the energy from a laser cavity. In essence, the apparatus amounts to a high-speed, voltage-variable mirror, whose reflectivity can be changed rapidly between 0 percent and 100 percent (see Solid-State Laser Engineering, W. Koechner, Springer-Verlag, N.Y. (1976), pp. 441 ff). A similar technique is used for cavity dumping of CW-pumped solid-state lasers (op. cit., pp. 444ff). Notwithstanding, the variable voltage mirror disclosed in the '205 patent does not provide the useful functionality of a voltage variable output-coupling mirror.

Another form of laser that a particular embodiment of the instant invention relates to is a novel cavity dumped laser which provides for the acquisition of controllable pulses. FIG. 3 illustrates a conventional prior art arrangement of such a laser known as a "double-pass cavity dumper". In this system, the laser cavity is constructed using 100% reflective mirrors, arranged in a folded cavity configuration. At the centre of the folded region is a Bragg cell 30 which is comprised of a small block of light transmissive material with an acoustic transducer affixed to one side. A high power RF waveform of several watts is applied to the transducer, which in turn produces an acoustic wave characteristic of the waveform, in the Bragg cell 30. The cell is positioned so that the laser beam passes through it and the acoustic wave travels at right angles to the direction of the laser beam. For optimum efficiency the laser beam is polarized in a direction perpendicular to the direction of travel of the acoustic beam. The laser beam is diffracted by the acoustic beam and splits into two sub-beams, one continuing to propagate along its original direction and the other deflected at an angle dependent upon the acoustic frequency of the acoustic wave within the Bragg cell 30 along a different path. The relative intensity of the two beams can be modified and controlled by varying or maintaining the intensity of the RF signal used to generate the acoustic wave. The useful laser output signal is obtained by utilizing the deflected portion of the beam. Such a system is used in lasers where the active medium is not long-lived. Once consequence of this is that the medium is not an effective means of storing energy, and efforts to generate high intensity laser pluses rely on storing the energy as circulating photons instead. Thus when circulating power has reached its peak value, the energy is dumped as completely as possible. Since the round trip time of a laser cavity is typically 10 nanoseconds, even a 99% efficient cavity will loose over 90% of its energy in a few microseconds; thus it is evident that this method is only effective for generating very short laser pulses. Since the laser cavity is always oscillating, it does not obtain the very large output pulses obtained with a Q-switch, and the photon losses between pulses severely limits the overall efficiency of most systems.

In both the conventional Q-switch and cavity dump laser systems, it is desired to switch in a nearly binary manner, to provide pulses generated by allowing substantially all of the energy in the lasing medium to be used in an on-off, all or none manner, substantially instantaneously. Heretofore, various switching schemes have been developed to provide quick transitions between switched states.

However, in accordance with this invention, control of the amount and duration of the energy provided in a laser output pulse is afforded by effectively providing a variable mirrored cavity, wherein the ratio of light that is extracted from the cavity to the remaining portion within the cavity can be precisely controlled. It should be understood that although the mirror's reflectivity in the instant invention is fixed, the effect of controlling the amount of light that is extracted from the cavity, precisely, by for example controlling the polarization state within any increment, is tantamount to providing a variable reflectance output mirror. Heretofore, one, two or three voltage levels via switches controlled a variable wave plate to effect Q-switching; however, now, by practicing the teachings of the instant invention, a Pockels cell, for example can be controlled by a computer generated waveform to provide one or more "designer" output pulses that have a desired shape and duration, such that the energy within the pulse is dispersed according to the computer generated input waveform driving the system. In prior art optical cavities, varying the voltage applied to the Pockels cell is only a means of varying the cavity loss; the output coupling is fixed in conventional systems. Therefore any "partial" or "stepped" switching is essentially wasteful, since while useful output is extracted from the output mirror, a similar if not larger beam will bounce off the polarizer as waste. In the laser system of the instant invention the energy remains stored in the long-lived medium unless extracted as useful output.

Conveniently, the device and method of the invention provides a means of controlling the energy distribution within an output pulse, as well as providing a means of controlling the duration of a pulsed signal. Yet still further, the invention allows a voltage input waveform to be modified in real-time while cutting, or other procedures are occurring, in order to optimize a particular task or to vary a particular task in real-time.

Yet still further, this system conveniently provides for real-time genetic learning algorithms to be utilized such that optimization is afforded while the device is in a learning mode of operation. Feedback means can be provided such that the laser's output pulse can be varied in accordance with its result, for example in cutting or ablating applications.

In contrast the aforementioned Q-switched devices are far more limited in producing one desired output response by applying one, two or three switched voltage levels as inputs to produce one, two or three output pulses respectively, and are inherently wasteful.

Heretofore, it has been an object of Q-switched lasers to provide a device that performs like a high-speed, voltage-variable deflecting mirror or shutter, whose transmission can be changed rapidly between 0 percent and 100 percent. In contrast to this, and in accordance with the teachings of this invention, it is an object to provide a device that performs as if it had voltage variable output coupling mirror, variable in such a manner as it could change its reflectivity, through a plurality of pre-programmed transitions between 0 and 100 percent in such a manner as to characterize a complex input computer generated waveform having a plurality of transitions. In preferred embodiments of the invention, the complex waveform ensures that switching does not occur too quickly so that the laser pulse is not Q-switched but has a predetermined shape and duration. In contrast with the Q-switched laser operation, it is not desirous to have the laser medium dump all of its stored energy quickly as possible, but rather distributed in a controlled manner for the duration of the output pulse. For example, if it is desirable to obtain an output pulse with a gradually rising intensity, it is necessary to closely control the early portion of the complex waveform to ensure that only a small amount of energy is extracted from the medium during the early part of the pulse, in order that a larger amount is available for the later, high intensity, portion of the pulse.

It is an object of this invention, to provide an optical device that is capable of offering control of the intensity, duration, and pulse envelope from a laser, over durations of a few tens of nanoseconds to hundreds of milliseconds, wherein the energy distribution of an output pulse is dependent upon a programmed input waveform stored within a memory device.

SUMMARY OF THE INVENTION

In accordance with the invention, a laser cavity is provided, comprising: two substantially totally reflecting surfaces for preventing light incident thereon from exiting said surfaces; a long-lived lasing medium having a lifetime of at least two orders of magnitude longer than the cavity lifetime disposed within an optical path between the two reflecting surfaces for emitting light energy in a direction to be reflected by said reflecting ends;

an energy source for providing energy to the lasing medium;

a polarizer within the cavity for permitting passage of light energy having a first direction of polarization and for reflecting light of an orthogonal polarization to said first direction;

a quarter wave plate disposed within the cavity between the polarizer and one of the two reflecting surfaces for rotating the polarization of light passing therethrough a variable wave plate for variably rotating the polarization of light passing therethrough in a controlled manner and being controllably adjustable so as to provide a variable degree of elliptical polarization to be induced in a controlled manner so that the amount of light deflected by the polarizer is controllably variable;

a waveform generator for generating an amplified complex signal having a plurality of maxima and minima corresponding to a single pulse laser output signal and for providing an amplified complex signal to the variable waveplate to yield the single pulse laser output signal.

In accordance with the invention there is further provided, a laser cavity comprising: two reflecting mirrors which form ends of the laser cavity, the mirrors both being substantially non-transmissive to light propagating within the cavity and for reflecting all light incident thereon within the cavity;

an active long-lived lasing medium having a lifetime of at least two orders of magnitude longer than the cavity lifetime disposed along a path within the cavity between the two mirrors;

a polarizing steering means for passing light in a first predetermined polarization state, incident thereon therethrough along a path towards one of the mirrors, and for deflecting light in an other polarization state to another path away from said one of the mirrors to an output port of the laser cavity disposed between the two mirrors;

means for providing a computer generated complex amplified signal for generating a single laser pulse;

and, means responsive to the complex amplified signal for variably controlling the state of polarization between the active lasing medium and one of the mirrors to effect light to be variably directed to one of the output of the laser cavity and the path within the cavity between the two mirrors and for controlling the pulse shape of the output pulse of light corresponding to the computer generated complex amplified signal.

In accordance with another aspect of the invention, a method is provided for producing a controllable laser signal comprising the steps of:

providing a cavity with two mirrors;

providing a long-lived lasing medium having a lifetime of at least two orders of magnitude longer than the cavity lifetime for emitting light energy within said cavity;

providing energy to the lasing medium;

providing a polarization control circuit for extracting light from within the cavity in a controllable, non-binary manner in dependence upon its polarization state;

controlling the polarization of light within said cavity in a variable, non-binary, manner by providing a computer generated complex waveform signal to an amplifier, said complex waveform signal having plurality of maxima and a plurality of minima;

amplifying said complex waveform to yield a complex amplified signal being an amplified representation of the complex waveform; and providing said complex amplified signal to control the polarization control circuit.

In accordance with another aspect of the invention, a method of controlling the shape of a pulse of light extracted from a laser cavity having a long-lived lasing medium having a lifetime of at least two orders of magnitude longer than the cavity lifetime is provided comprising the steps of:

providing a computer generated waveform for characterizing the pulse shape; characterizing the computer generated waveform in the form of an amplified signal;

applying the amplified signal to a controller within the laser cavity for controlling the pulse shape and duration of light extracted from a laser cavity.

There is further provided, a laser cavity comprising two reflective surfaces;

a lasing medium for emitting light energy within said cavity;

a waveform generator responsive to a computer generated waveform for providing a waveform corresponding to a desired output response;

an amplifier for amplifying the waveform and for providing an amplified waveform;

a control circuit for extracting light from within the cavity in a controllable, non-binary manner in dependence upon the computer generated waveform.

BRIEF DESCRIPTION OF THE DRAWINGS

Exemplary embodiments of the invention will now be described in conjunction with the drawings in which:

FIG. 5 is a plot of voltage versus time for a computer generated amplified input waveform shown at 5a over a plot of voltage versus time 5b of an output signal responsive to the input signal shown at 5a;

FIG. 6 is a plot of voltage versus time for a computer generated amplified input waveform shown at 6a over a plot of voltage versus time 6b of an output signal responsive to the input signal shown at 6a.

DETAILED DESCRIPTION

Figure 1:
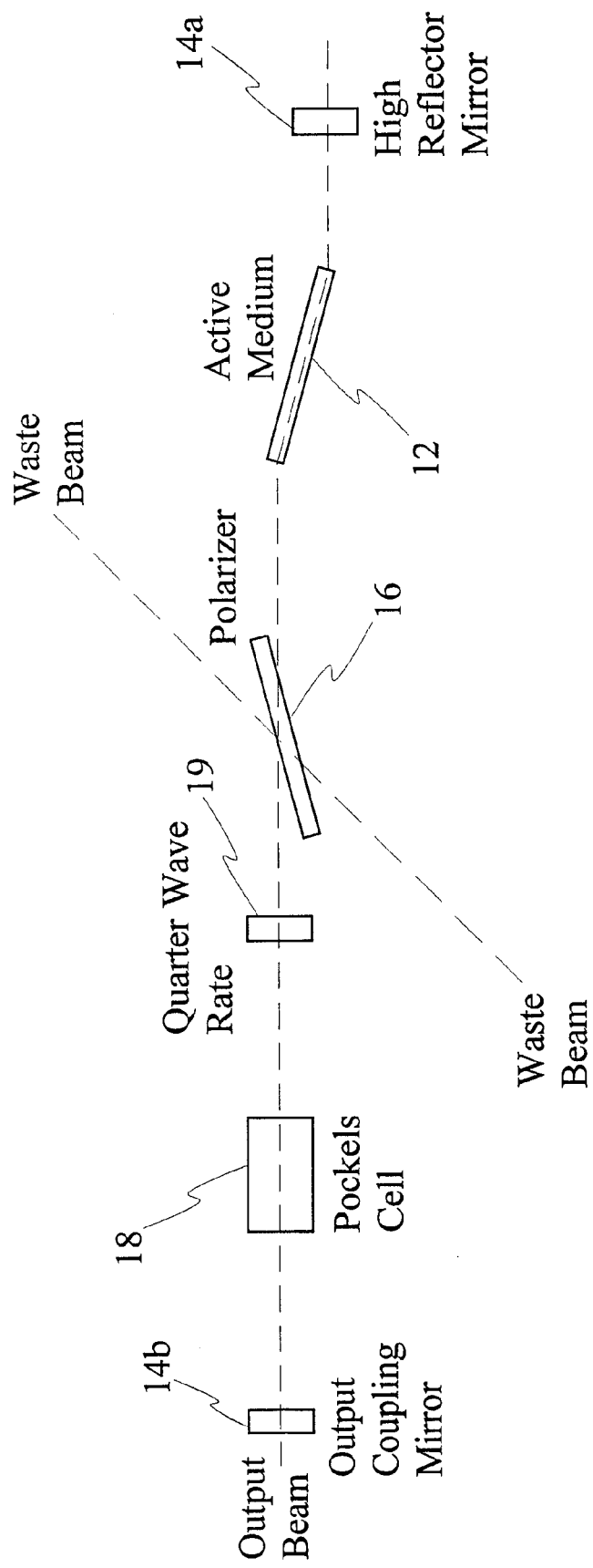
FIG. 1 is a schematic block diagram of a prior art conventional laser cavity having one reflector that is partially transmissive for providing output coupling and one reflector that is totally reflective.
Figure 2:
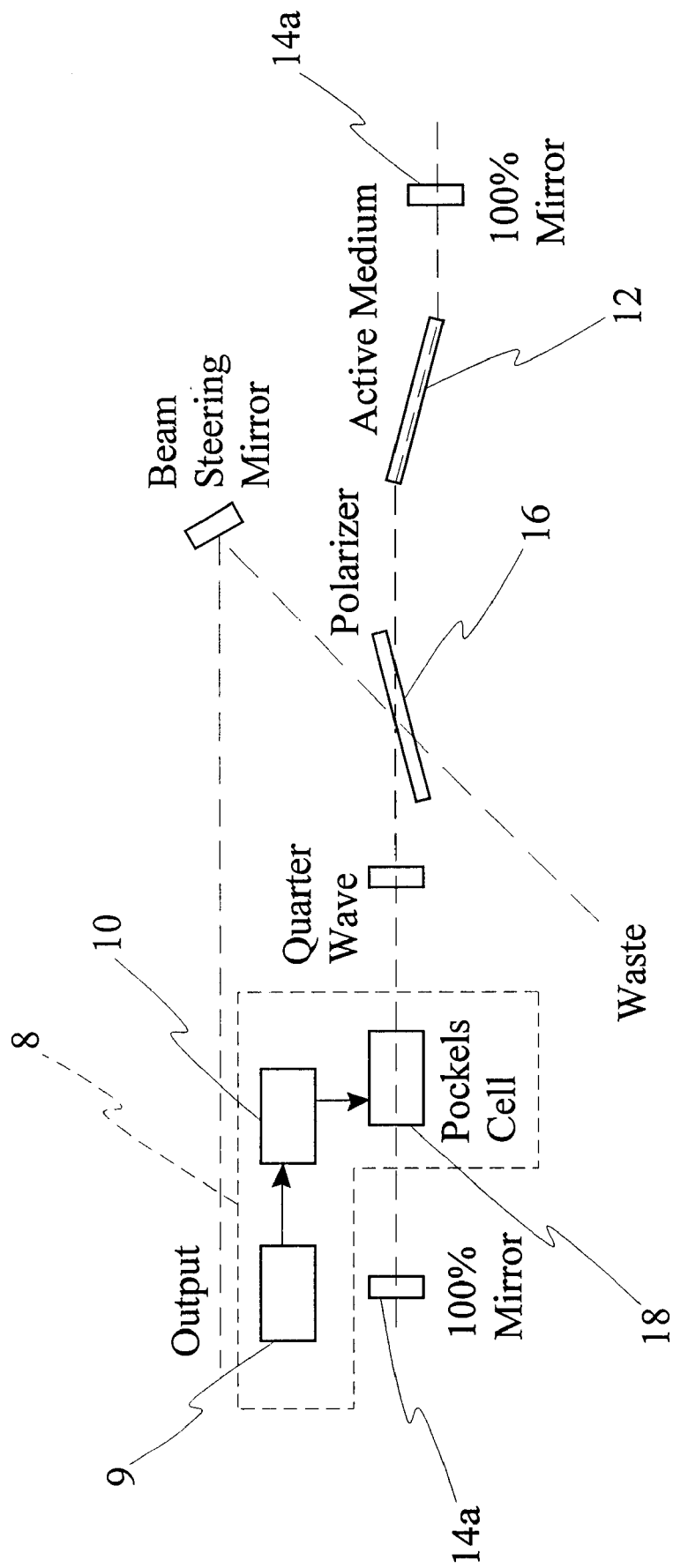
FIG. 2 is a schematic block diagram of a laser cavity in accordance with this invention, wherein the cavity is formed of two totally reflecting mirrors.

Referring now to FIG. 2, an embodiment of the invention is shown, including a control circuit 8 comprising a waveform generator 9, an amplified voltage source 10 coupled to receive and amplify a waveform generated from the waveform generator 9 and a Pockels cell 18 coupled to the amplified voltage source for receiving an amplified voltage characteristic of the of the generated waveform. One substantial difference between the optical circuit shown in FIG. 2, and the prior art optical circuit of FIG. 1, is the presence of a cavity formed of two highly reflecting mirrors 14a and more importantly a completely controllable means of extracting energy from the cavity in modes other than Q-switched modes of operation. Essentially by applying a variable voltage in the form of an amplified computer generated waveform to the Pockels cell 18, it functions as a controller for the circuit. Ideally, the mirrors should be as close to 100% reflective as possible and therefore not allow any light propagating with the cavity from transmitting therethrough. The output light is captured by receiving the light reflected from the polarizer 16 after it has traveled through the wave plate 19, the Pockels cell and returning to the polarizer 16. This circuit is similar in many respects to a Q-switch, in that a quarter wave plate is used to "bias" the cavity polarization to prevent oscillation and allow for a large build-up of gain in the active medium 12. However, rather than employ convention techniques of using the Pockels cell to simply open the cavity in a binary open-and-shut two state way, in this instance the Pockels cell is used to rotate the polarization in a controlled manner so as to achieve a precisely controlled amount of output coupling. Hence, the Pockels cell serves as a controllably variable wave plate. As this simultaneously adjusts the laser threshold, this invention allows one to determine exactly how much available gain will be utilized at any instant, and hence the intensity of the resulting laser oscillation can be precisely controlled within the cavity.

In this manner, the application of a very short high voltage pulse can result in the laser operating like a Q-switch; wherein a lower voltage pulse results in a high threshold laser that produces a low intensity pulse; this leaves the gain in the medium which can later be extracted by applying a somewhat higher voltage pulse. Thus, a series of multiple-laser pulses can be generated by applying a step function of escalating voltage to the Pockels cell, each step lowering the threshold further. Furthermore a more complex time-varying waveform will result in a laser output which follows it accordingly. Thus, the Pockels cell voltage can be used to cause the laser to produce a wide variety of pulse shapes and durations.

A Pockels cell called BBO, was used in experiments. This material has a quarter wave voltage of 3000 V. As well an amplifier capable of producing a 300 fold gain up to a maximum of 1500 V made by TREK Ltd., was used. Computer generated waveforms were down loaded to a function generator, where they were synthesized and provided as a 0 to 5 V signal to the high voltage amplifier. The high voltage amplifier provided the Pockels cell with an amplified representation of the computer-generated waveforms. Of course, the high voltage amplifier could be built-in to the waveform generator for producing an amplified input waveform. Thus, in accordance with this invention, an amplifier within or external to the waveform generator can be provided.

In contrast to a Q-switched system, the preferred mode of operation for variable pulse operation is to use the quarter wave plate to rotate the plane of polarization through an angle less than 90 degrees, to a point at which the laser just dips below threshold and ceases to operate. The voltage applied to the Pockels cell is then configured to rotate the plane of polarization back towards zero, lowering the threshold and allowing laser action to begin. If a "square" laser output pulse is desired, the voltage applied to the Pockels cell must be only very gradually increased to inhibit Q-switching. This allows the decreasing gain caused by extracting laser energy to be tracked by a decreasing threshold At any point where gain is still stored in the laser medium, further gradual increase in the Pockels cell drive voltage will bring about an increase in the instantaneous output power of the laser, a rapid increase in the Pockels cell drive voltage can bring about a Q-Switched pulse, or a decrease can terminate the output entirely.

In this manner, from a test laser system, a single Q-switched laser pulse of 0.1 microseconds to a pulse over 100 microseconds in duration was generated. Conveniently, control is afforded by the test laser system that allowed the pulse to begin as a low amplitude pulse which was programmed to increase at its end, or vice versa. As well the system could be programmed to generate a pulse whose amplitude as greatest in its middle. Furthermore, complex sequences of sub-pulses can be generated within a single pulse.

To our knowledge, such versatility was not afforded within a single laser system, heretofore.

Of course numerous other embodiments may be envisaged, without departing from the sprit and scope of the invention. For example, instead of electro-optic control being provided within the laser cavity, an acousto-optic method and circuit for controlling the shape and duration of a pulse of light extracted from the circuit is provided. The configuration is similar to that shown in FIG. 2, however, the drive sequence is reversed.

Figure 3:
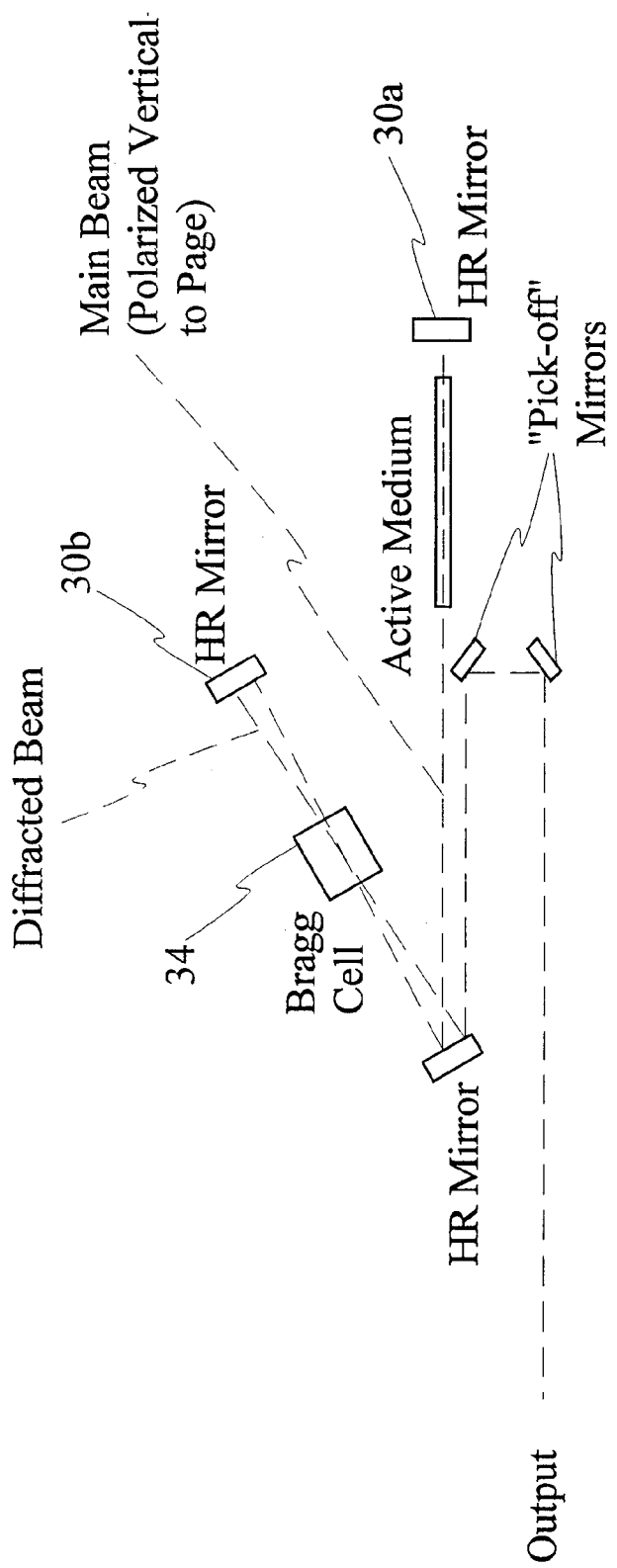
FIG. 3 is a schematic block diagram of a prior art acousto-optic laser cavity.
Figure 4:
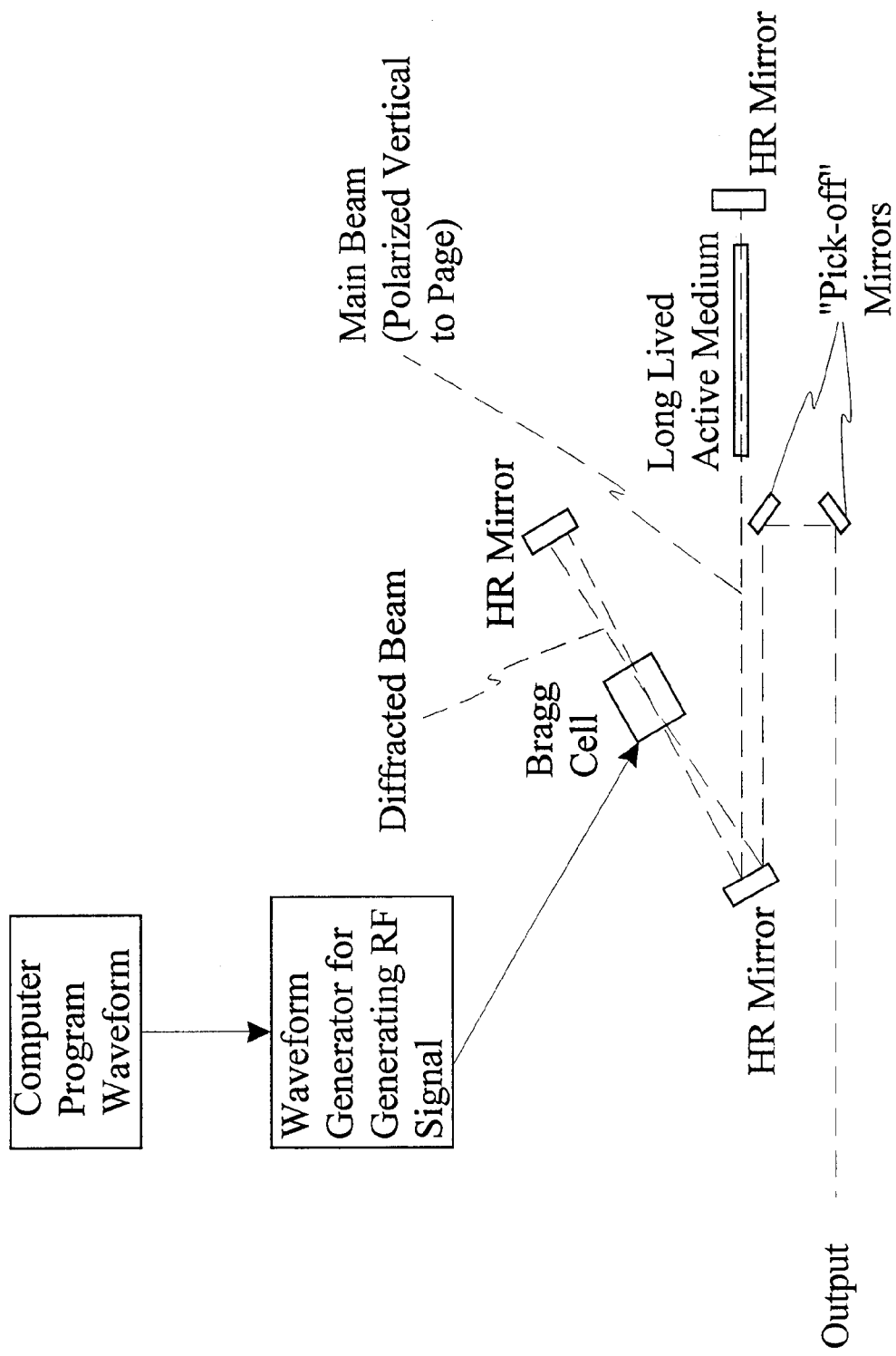
FIG. 4 is a schematic block diagram in accordance with another embodiment of the invention based on the circuit of FIG. 3.

Referring now to FIG. 3, a cavity is provided comprising 100% reflecting mirrors 30a and 30b arranged in a folded-cavity configuration. A Bragg cell 34 is disposed intermediate the two mirrors. The Bragg cell comprises a small block of light transmissive material with an acoustic transducer affixed to one side. The Bragg cell is responsive to a high power (several watts) RF signal applied to the transducer, which initiates an acoustic wave in the transducer. In order to optimize efficiency, the laser is polarized in a direction perpendicular to the direction of travel of the acoustic beam. In operation the laser beam is diffracted by the acoustic beam and is split into two subbeams, one of which travels along its original direction, the other being deflected through an angle determined by the frequency of the acoustic wave in the Bragg cell. The relative intensity of the two beams is varied by modifying the intensity of the RF signal used to generate the acoustic wave. The useful laser output signal is obtained by receiving the deflected portion of the beam. Thus, by controlling the power of the RF signal provided to the Bragg cell, the output pulse can be controlled in both pulse shape and duration. By providing a complex RF signal using a waveform generator as the basis for the generating the signal, a computer generated signal having predetermined characteristics can be provided to yield a desired RF signal providing power to the Bragg cell. In contrast, in known systems where the active medium is not long-lived, high intensity energy is dumped as completely as possible.

The controlled variable output coupling laser in accordance with this invention provides output coupling that is essentially the same as that described heretofore using an electro-optic control circuit such as an amplified waveform generator and a Pockels cell in the arrangement of FIG. 2; however the drive sequence in this acousto-optic embodiment is reversed from that of the electro-optic case.

In the instance where the Bragg cell is powered by a sufficiently high level RF signal, the laser cannot reach threshold due to the significant amount of output coupling. While the RF power is maintained at a high value, the active medium is pumped for the desired time period and the gain is stored in a long-lived medium, similar to the Q-switched laser. When the desired pump level is reached, the power to the Bragg cell is lowered to reduce the output coupling, thereby bringing the threshold down to where the laser can oscillate. At this time, the diffracted beam is present and can be extracted and utilized similar to the useful beam reflected by the polarizer in the electro-optic embodiment of this invention.

In operation, a waveform generator responsive to a programmed input waveform provides an output signal corresponding to the input waveform to an RF amplifier. The resulting-program-generated amplified RF signal controls the diffraction efficiency and hence, the ratio of input to output coupling.

In summary, the acousto-optic method requires the provision of a laser cavity comprising a long-lived active medium, a pump source, a polarizing element which may simply be the Brewster angled rod ends, and an acousto-optic modulator, an RF amplifier coupled to receive a signal from a waveform generator, wherein the characteristics of the signal received from the waveform generator determine the pulse shape and duration which is received from the laser cavity.

Figure 5:
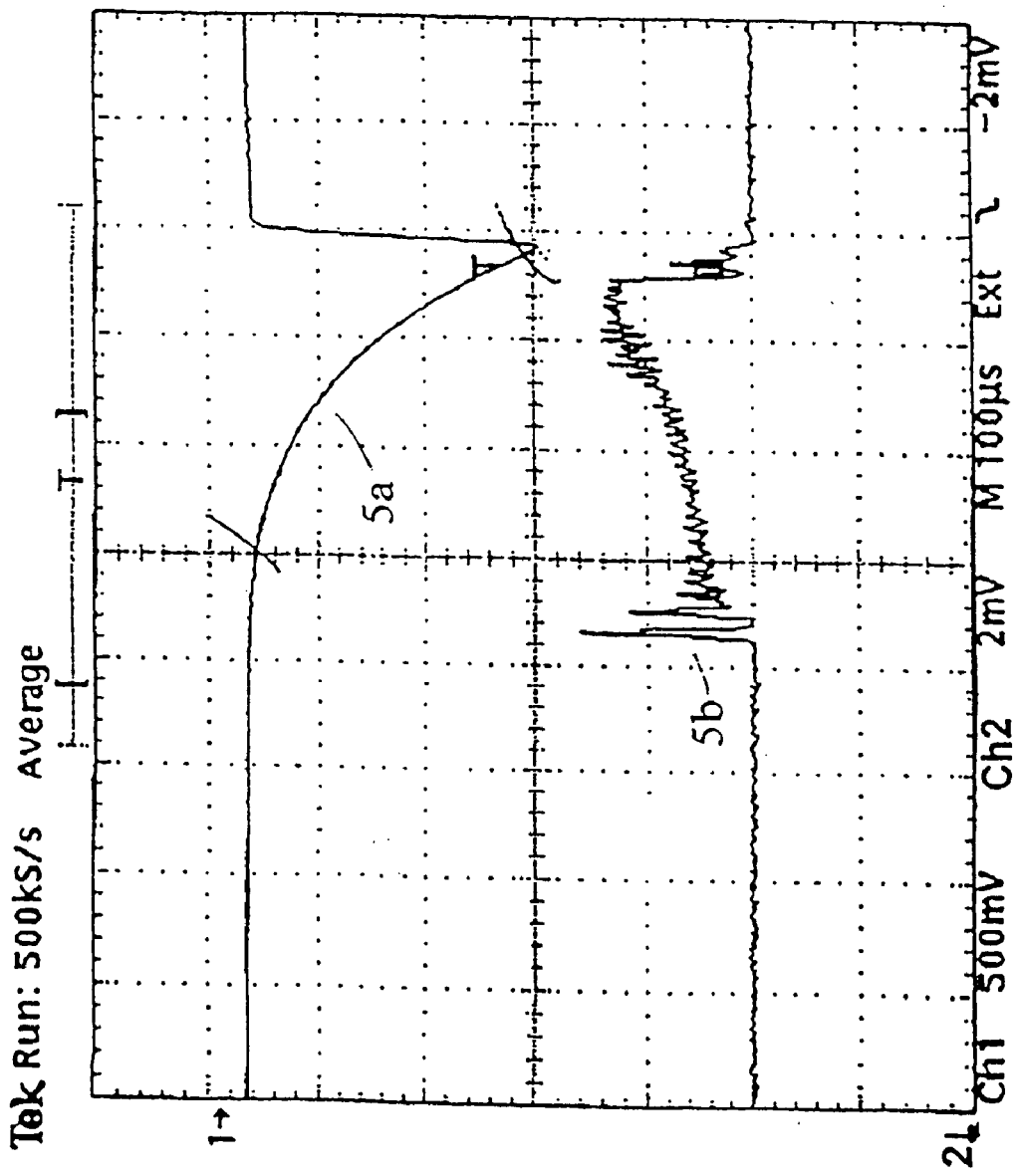

Turning now to FIG. 5, an input computer generated amplified input pulse waveform is shown at 5a, comprised of approximately 65,000 small steps. Preferably, enough values are used in the generation of the waveform so as to appear relatively smooth; more specifically, enough small increments are preferred so that the amplifier is unable to respond to each step, thereby providing a relatively smooth signal as shown at 5a. Whereas, 5b illustrates the useful laser output signal from the input pulse.

Figure 6:
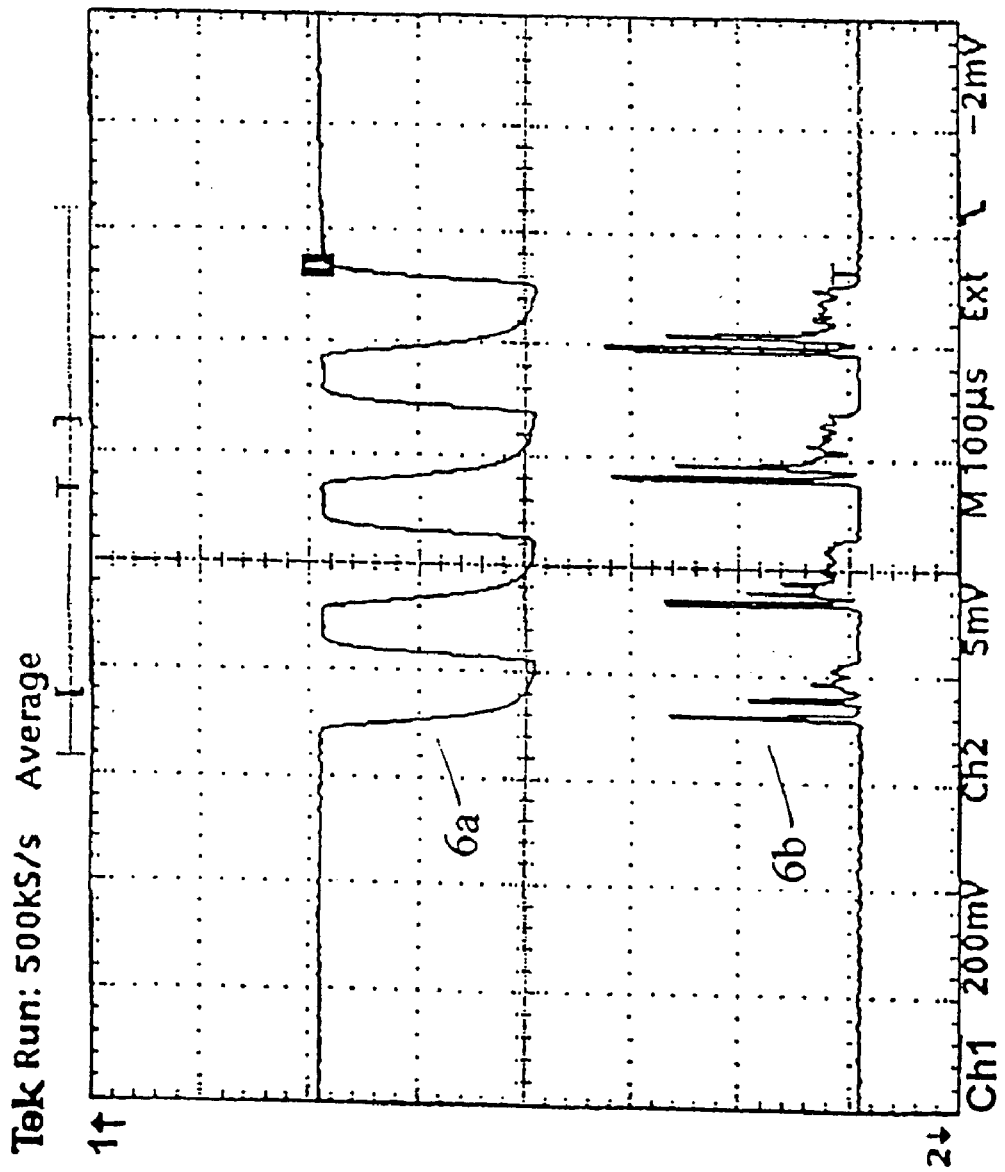

In FIGS. 6, 6a and 6b respectively, illustrate another programmed amplified input waveform and the output response.

What is claimed is:

1. A laser cavity comprising two substantially totally reflecting surfaces for preventing light incident thereon from exiting said surfaces;
a lasing medium having a lifetime of at least two orders of magnitude longer than the cavity lifetime disposed within an optical path between the two reflecting surfaces for emitting light energy in a direction to be reflected by said reflecting ends;
an energy source for providing energy to the lasing medium;
a polarizer within the cavity for permitting passage of light energy having a first direction of polarization and for reflecting light of an orthogonal polarization to said first direction;
a quarter wave plate disposed within the cavity between the polarizer and one of the two reflecting surfaces for rotating the polarization of light passing therethrough a variable wave plate for variably rotating the polarization of light passing therethrough in a controlled manner and being controllably adjustable so as to provide a variable degree of elliptical polarization to be induced in a controlled manner so that the amount of light deflected by the polarizer is controllably variable;
a waveform generator for generating an amplified complex signal having a plurality of maxima and minima corresponding to a single pulse laser output signal and for providing an amplified complex signal to the variable waveplate to yield the single pulse laser output signal.

2. A laser cavity comprising:
two reflecting mirrors which form ends of the laser cavity, the mirrors both being substantially non-transmissive to light propagating within the cavity and for reflecting all light incident thereon within the cavity;
an active long-lived lasing medium having a lifetime of at least two orders of magnitude longer than the cavity lifetime disposed along a path within the cavity between the two mirrors;
a polarizing steering means for passing light in a first predetermined polarization state, incident thereon therethrough along a path towards one of the mirrors, and for deflecting light in an other polarization state to another path away from said one of the mirrors to an output port of the laser cavity disposed between the two mirrors;
means for providing a computer generated complex amplified signal for generating a single laser pulse;
and, means responsive to the complex amplified signal for variably controlling the state of polarization between the active lasing medium and one of the mirrors to effect light to be variably directed to one of the output of the laser cavity and the path within the cavity between the two mirrors and for controlling the pulse shape of the output pulse of light corresponding to the computer generated complex amplified signal.

3. A laser cavity as defined in claim 2, wherein the means for variably controlling the polarization includes an electro-optic cell.

4. A laser cavity as defined in claim 2 further comprising a high voltage amplifier coupled with the means for variably controlling the state of polarization, said high voltage amplifier in response to the computer generated waveform being capable of providing an amplified output voltage signal corresponding to the computer generated waveform, wherein the amplified output voltage signal is for providing variable nonbinary control of said electro-optic cell.

5. A method for producing a controllable laser signal comprising the steps of:
providing a cavity with two mirrors;
providing a lasing medium having a lifetime of at least two orders of magnitude longer than the cavity lifetime for emitting light energy within said cavity;
providing energy to the lasing medium;
providing a polarization control circuit for extracting light from within the cavity in a controllable, non-binary manner in dependence upon its polarization state;
controlling the polarization of light within said cavity in a variable, non-binary manner by providing a computer generated complex waveform signal to an amplifier, said complex waveform signal having plurality of maxima and a plurality of minima;
amplifying said complex waveform to yield a complex amplified signal being an amplified representation of the complex waveform; and
providing said complex amplified signal to control the polarization control circuit.

6. A method of controlling a shape of a pulse of light, comprising the steps of:
   providing a laser cavity having a lasing medium having a lifetime of at least two orders of magnitude longer than a lifetime of the laser cavity;
   providing a computer generated waveform for characterizing the pulse shape;
   characterizing the computer generated waveform in a form of an amplified signal; and
   applying the amplified signal to a controller within the laser cavity for controlling the pulse shape and duration of light from the laser cavity.

7. A method as defined in claim 6 wherein the amplified signal is in the form of a voltage.

8. A method as defined in claim 6, wherein the amplified signal is in the form of an RF signal.

9. A method as defined in claim 7 wherein the controller comprises an electro-optic device.

10. A method as defined in claim 8 wherein the controller comprises an acousto-optic device.

11. A method as defined in claim 6 wherein the computer generated waveform is comprised of at least 100 values.

12. A method as defined in claim 7, wherein the controller comprises a Pockels cell.

13. A method as defined in claim 8 wherein the controller comprises a Bragg cell.

* * * * *

UNITED STATES PATENT AND TRADEMARK OFFICE
CERTIFICATE OF CORRECTION

PATENT NO. : 6,529,540 B1
DATED : March 4, 2003
INVENTOR(S) : Demmer et al.

It is certified that error appears in the above-identified patent and that said Letters Patent is hereby corrected as shown below:

Column 10,
Line 6, "long-lived" should be deleted.

Signed and Sealed this

Eighteenth Day of May, 2004

JON W. DUDAS
*Acting Director of the United States Patent and Trademark Office*